(12) United States Patent
Tsuchida et al.

(10) Patent No.: US 11,118,277 B2
(45) Date of Patent: Sep. 14, 2021

(54) METHOD FOR PRODUCING METAL POROUS BODY, AND PLATING APPARATUS

(71) Applicant: SUMITOMO ELECTRIC TOYAMA CO., LTD., Imizu (JP)

(72) Inventors: Hitoshi Tsuchida, Imizu (JP); Ryuuichi Yoshikawa, Imizu (JP); Hiroshi Ooi, Imizu (JP)

(73) Assignee: SUMITOMO ELECTRIC TOYAMA CO., LTD., Imizu (JP)

( * ) Notice: Subject to any disclaimer, the term of this patent is extended or adjusted under 35 U.S.C. 154(b) by 250 days.

(21) Appl. No.: 16/335,856

(22) PCT Filed: Aug. 10, 2018

(86) PCT No.: PCT/JP2018/030067
§ 371 (c)(1),
(2) Date: Mar. 22, 2019

(87) PCT Pub. No.: WO2019/116633
PCT Pub. Date: Jun. 20, 2019

(65) Prior Publication Data
US 2021/0040634 A1    Feb. 11, 2021

(30) Foreign Application Priority Data

Dec. 15, 2017  (JP) .............................. JP2017-240171

(51) Int. Cl.
| | |
|---|---|
| *C25D 17/14* | (2006.01) |
| *C25D 1/08* | (2006.01) |
| *C25D 5/56* | (2006.01) |
| *C25D 17/00* | (2006.01) |
| *H01M 4/66* | (2006.01) |
| *H01M 4/74* | (2006.01) |
(Continued)

(52) U.S. Cl.
CPC ............... *C25D 1/08* (2013.01); *C25D 5/56* (2013.01); *C25D 17/005* (2013.01); *C25D 17/14* (2013.01);
(Continued)

(58) Field of Classification Search
None
See application file for complete search history.

(56) References Cited

U.S. PATENT DOCUMENTS

| | | |
|---|---|---|
| 2,341,157 A | 2/1944 | Nachtman |
| 6,197,170 B1 | 3/2001 | Yokogawa |
| (Continued) | | |

FOREIGN PATENT DOCUMENTS

| | | | | |
|---|---|---|---|---|
| DE | 3891150 | * | 3/1991 | ............... C25D 7/06 |
| EP | 2384100 A2 | | 11/2011 | |
| | (Continued) | | | |

OTHER PUBLICATIONS

Notification of Reason for Refusal dated Aug. 17, 2020 in Korean Patent Application No. 10-2019-7005086 (7 pages) with an English translation (7 pages).

*Primary Examiner* — Stefanie S Wittenberg
(74) *Attorney, Agent, or Firm* — Faegre Drinker Biddle & Reath LLP

(57) ABSTRACT

A method for producing a metal porous body includes the steps of: performing electrical conduction treatment on a surface of a skeleton of a sheet-like resin porous body having the skeleton with a three-dimensional network structure, to obtain a conductive resin porous body having a conductive layer; performing electroplating treatment on a surface of a skeleton of the conductive resin porous body to obtain a plated resin porous body having a metal plating layer; and performing treatment of removing at least the resin porous body from the plated resin porous body to obtain a metal porous body. In the electroplating treatment, the conductive resin porous body is supplied with power by a rotating electrode roller, the electrode roller is supplied with power by bringing a power supply brush formed by a material containing iron as a main component into sliding contact with a part of a rotation shaft, and at least a surface (Continued)

of at least the part of the rotation shaft with which the power supply brush is brought into contact is formed by a material containing iron or nickel as a main component.

9 Claims, 10 Drawing Sheets

(51) Int. Cl.
  *H01M 4/80* (2006.01)
  *B01D 39/20* (2006.01)
(52) U.S. Cl.
  CPC ............ *H01M 4/661* (2013.01); *H01M 4/74* (2013.01); *H01M 4/80* (2013.01); *B01D 39/2027* (2013.01)

(56) References Cited

U.S. PATENT DOCUMENTS

2013/0121873 A1  5/2013  Kimura et al.
2018/0048104 A1  2/2018  Saitou

FOREIGN PATENT DOCUMENTS

| | | | | |
|---|---|---|---|---|
| JP | H05-97082 | A | 4/1993 | |
| JP | H06-84775 | A | 3/1994 | |
| JP | H10219493 | * | 8/1998 | ............... C25D 1/20 |
| JP | 3075438 | U | 2/2001 | |
| JP | 2001-157413 | A | 6/2001 | |
| JP | 2001-346363 | A | 12/2001 | |
| JP | 2011-205816 | A | 10/2011 | |
| JP | 2015-153648 | A | 8/2015 | |
| KR | 1995-0014636 | B1 | 12/1995 | |
| KR | 200126617 | | 11/1998 | |
| KR | 20000064951 | A | 11/2000 | |
| KR | 200209228 | Y1 | 3/2001 | |
| KR | 20090081792 | * | 7/2009 | ............. C25D 17/00 |
| KR | 2014-0018896 | A | 2/2014 | |
| KR | 2017-0106492 | A | 9/2017 | |
| WO | WO2009124393 | * | 10/2009 | ................ C25F 5/00 |
| WO | WO2017086767 | * | 5/2017 | ................ C25D 5/08 |

* cited by examiner

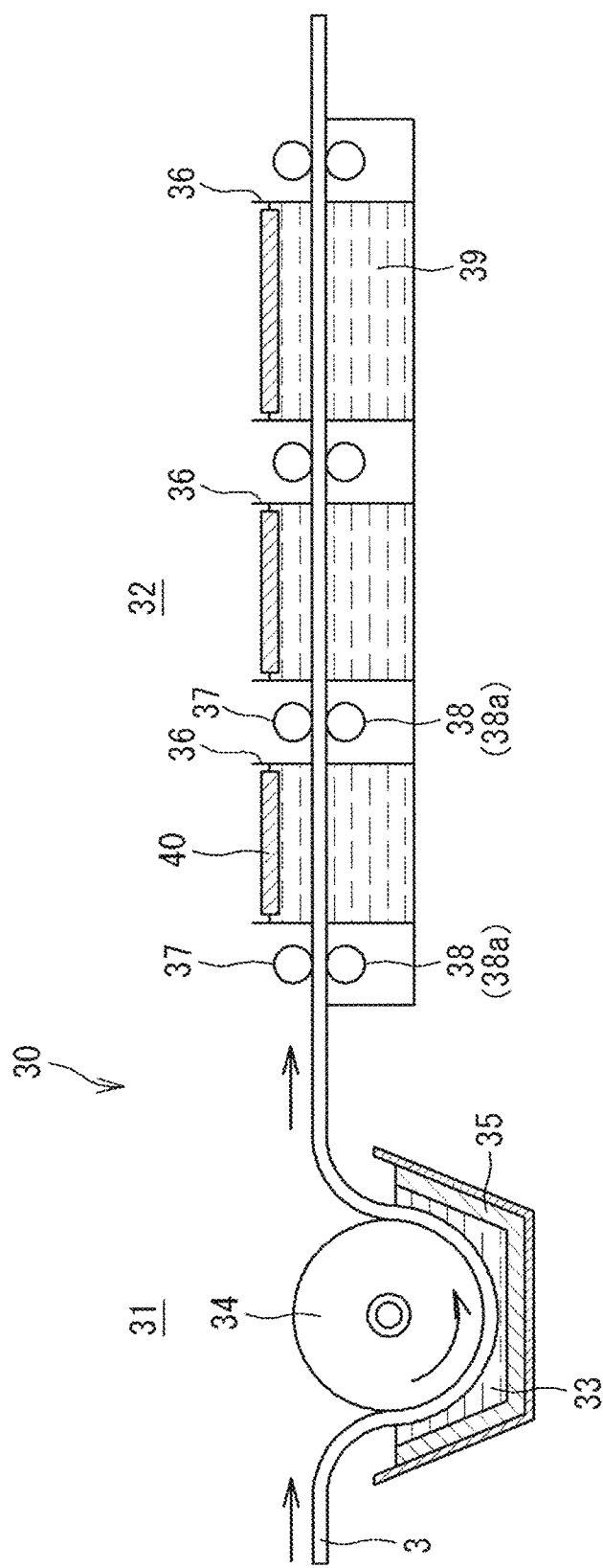

METHOD FOR PRODUCING METAL POROUS BODY, AND PLATING APPARATUS

TECHNICAL FIELD

The present invention relates to a method for producing a metal porous body and a plating apparatus.

This application claims priority on Japanese Patent Application No. 2017-240171 filed on Dec. 15, 2017, the entire contents of which are incorporated herein by reference.

BACKGROUND ART

Conventionally, a sheet-like metal porous body having a skeleton with a three-dimensional network structure has been used for various uses such as a filter that requires heat resistance, a battery electrode plate, a catalyst support, and a metal composite. As a method for producing the metal porous body, a method has been known in which, after the surface of the skeleton of a resin porous body is subjected to electrical conduction treatment, metal plating is performed by means of electroplating treatment and treatment of removing the resin porous body is performed, thereby obtaining a metal porous body (see, for example, PATENT LITERATURE 1).

In the method for producing the metal porous body described in PATENT LITERATURE 1, in performing the electroplating treatment, in order to form a metal plating layer on a single surface side or each surface side of a sheet-like resin porous body having a skeleton surface made conductive, electroplating treatment is repeatedly performed in a plurality of plating tanks while the resin porous body is being sequentially fed by feeding rollers and electrode rollers that serve as power supply cathodes outside the plating tanks. A current is sent to each electrode roller by bringing a rotation shaft of the electrode roller and a power supply brush into sliding contact with each other (see, for example, PATENT LITERATURE 2).

CITATION LIST

Patent Literature

PATENT LITERATURE 1: Japanese Laid-Open Patent Publication No. 2015-153648
PATENT LITERATURE 2: Japanese Laid-Open Utility Model Publication No. H5-97082
PATENT LITERATURE 3: Japanese Utility Model Registration No. 3075438
PATENT LITERATURE 4: Japanese Laid-Open Patent Publication No. 2001-157413
PATENT LITERATURE 5: Japanese Laid-Open Patent Publication No. 2011-205816
PATENT LITERATURE 6: Japanese Laid-Open Patent Publication No. 2001-346363
PATENT LITERATURE 7: Japanese Laid-Open Patent Publication No. H6-84775

SUMMARY OF INVENTION

A method for producing a metal porous body according to the present disclosure is a method for producing a metal porous body, comprising the steps of:
performing electrical conduction treatment on a surface of a skeleton of a sheet-like resin porous body having the skeleton with a three-dimensional network structure, to obtain a conductive resin porous body having a conductive layer;
performing electroplating treatment on a surface of a skeleton of the conductive resin porous body to obtain a plated resin porous body having a metal plating layer; and
performing treatment of removing at least the resin porous body from the plated resin porous body to obtain a metal porous body, wherein
in the electroplating treatment, the conductive resin porous body is supplied with power by a rotating electrode roller,
the electrode roller is supplied with power by bringing a power supply brush formed by a material containing iron as a main component into sliding contact with a part of a rotation shaft, and
at least a surface of at least the part of the rotation shaft with which the power supply brush is brought into contact is formed by a material containing iron or nickel as a main component.

A plating apparatus according to the present disclosure is a plating apparatus for performing electroplating treatment on a surface of a skeleton of a conductive resin porous body obtained by forming a conductive layer on a surface of a skeleton of a sheet-like resin porous body having the skeleton with a three-dimensional network structure, to form a metal plating layer, the plating apparatus comprising:
a plating tank;
an electrode roller capable of supplying power to the conductive resin porous body by rotating a rotation shaft while feeding the conductive resin porous body to the plating tank; and
a power supply brush configured to come into sliding contact with the rotation shaft of the electrode roller, wherein
the power supply brush is formed by a material containing iron as a main component, and
at least a surface of at least a part of the rotation shaft with which the power supply brush is in contact is formed by a material containing iron or nickel as a main component.

BRIEF DESCRIPTION OF DRAWINGS

FIG. 5 is a side cross-sectional view showing an example of a plating apparatus.

DESCRIPTION OF EMBODIMENTS

Technical Problem

Figure 1:
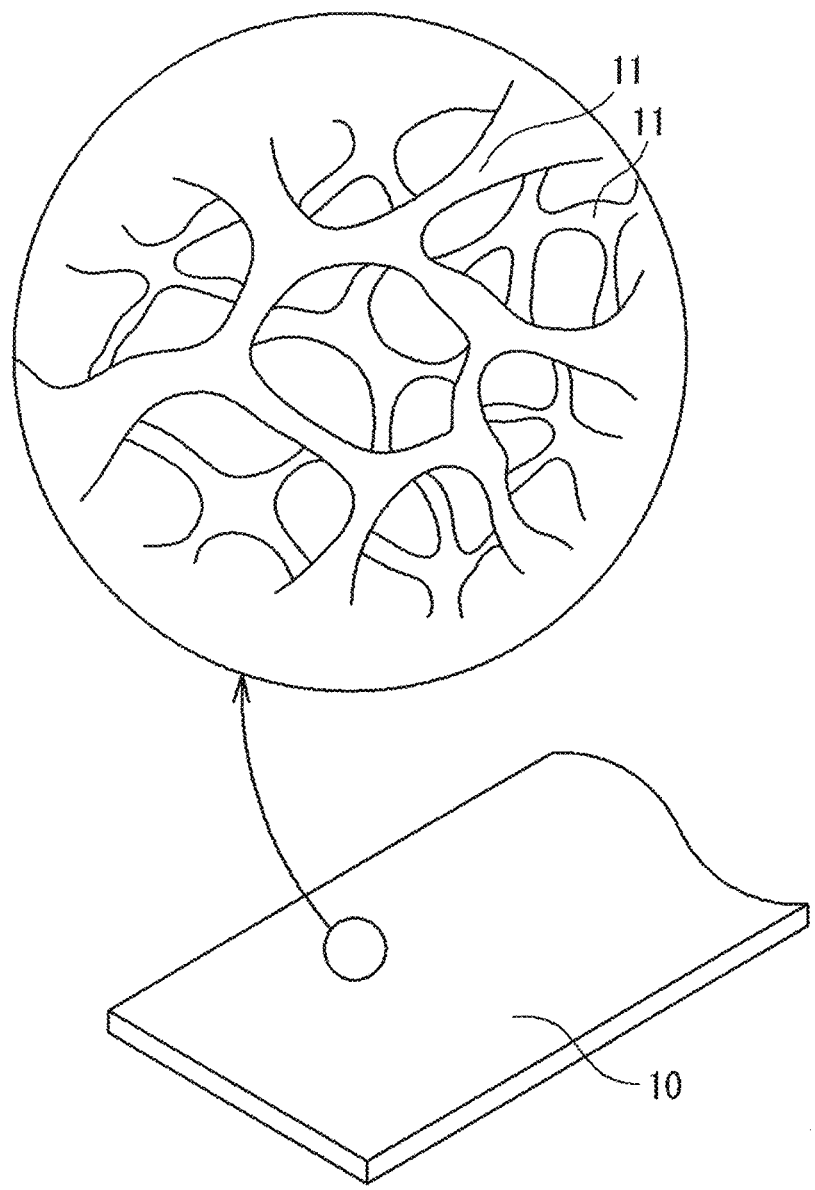
FIG. 1 is a schematic diagram showing a metal porous body having a skeleton with a three-dimensional network structure.

In the case of performing electroplating treatment on a sheet-like resin porous body as in the above-described conventional art, it is necessary to apply a large current to each electrode roller, since the surface area of the resin porous body is large. Therefore, a sintered body containing copper as a main component is generally used for a power supply brush for supplying power to each electrode roller.

However, the power supply brush made of copper is likely to corrode due to influence of corrosive fumes in an electroplating atmosphere. In particular, in the case where the power supply brush is made of a sintered body in order to improve sliding characteristics, the surface of the power supply brush is porous, and thus corrosion of the power supply brush is further accelerated. In addition, the power supply brush made of copper has low abrasion resistance, and thus, due to continued contact with the rotation shaft of the electrode roller, the power supply brush is easily abraded generating abrasion powder. Therefore, it is necessary to frequently replace the power supply brush, so that there is a problem that the productivity of the metal porous body decreases.

When the power supply brush is corroded or abrasion powder is generated therefrom, jerkiness (rotational failure) easily occurs in rotation of the electrode roller. In particular, jerkiness of the electrode roller easily occurs when the electrode roller is rotated at a low speed. In producing a metal porous body having a small coating weight per unit area (a metal porous body having a small plating thickness), when jerkiness occurs in the electrode roller, a plating thickness is greatly varied, and the skeleton of the metal porous body may be cracked to reduce the strength, resulting in a decrease in the quality of the metal porous body.

Therefore, the present disclosure has been made in view of such circumstances, and an object of the present disclosure is to provide a method for producing a metal porous body and a plating apparatus that can improve the quality and the productivity of the metal porous body.

Advantageous Effects of Present Disclosure

According to the present disclosure, it is possible to provide a method for producing a metal porous body and a plating apparatus that can improve the quality and the productivity of the metal porous body.

DESCRIPTION OF EMBODIMENTS OF INVENTION

First, contents of embodiments of the present invention will be listed and described.

(1) A method for producing a metal porous body according to an embodiment of the present invention is a method for producing a metal porous body, comprising the steps of:

performing electrical conduction treatment on a surface of a skeleton of a sheet-like resin porous body having the skeleton with a three-dimensional network structure, to obtain a conductive resin porous body having a conductive layer;

performing electroplating treatment on a surface of a skeleton of the conductive resin porous body to obtain a plated resin porous body having a metal plating layer; and performing treatment of removing at least the resin porous body from the plated resin porous body to obtain a metal porous body, wherein in the electroplating treatment, the conductive resin porous body is supplied with power by a rotating electrode roller, the electrode roller is supplied with power by bringing a power supply brush formed by a material containing iron as a main component into sliding contact with a part of a rotation shaft, and at least a surface of at least the part of the rotation shaft with which the power supply brush is brought into contact is formed by a material containing iron or nickel as a main component.

The "main component" refers to a component having a highest mass content, and another component may be intentionally or inevitably contained as long as the advantageous effects of the present invention are achieved.

According to the embodiment of the invention described in the above (1), it is possible to provide a method, for producing a metal porous body, which can improve the quality and the productivity of the metal porous body. Since the power supply brush is formed by a material containing iron as a main component, the abrasion resistance of the power supply brush is improved, the amount of abrasion powder generated from the power supply brush is reduced, and rotation of the electrode roller is stabilized. In addition, since at least the surface of the rotation shaft of the electrode roller is formed by a material containing iron or nickel as a main component, corrosion of the rotation shaft is inhibited, and rotation of the electrode roller is stabilized. Since jerkiness of the rotation shaft of the electrode roller is inhibited, the thickness of the metal plating layer formed on the surface of the skeleton of the conductive resin porous body is less varied. As a result, in the case of producing the metal porous body in which the thickness of the metal plating layer is small, cracking can be inhibited from occurring in the skeleton of the metal porous body thereby to reduce the strength of the metal porous body, and thus the quality of the metal porous body can be improved.

(2) In the method for producing a metal porous body according to the above (1), the rotation shaft is preferably formed by a material that contains iron as a main component and whose periphery is coated with a material containing nickel as a main component.

According to the embodiment of the invention described in the above (2), progress of corrosion due to contact between different types of metals can be delayed, since the difference between the ionization tendency of iron and the ionization tendency of nickel is small. Furthermore, since nickel has better corrosion resistance than iron, corrosion of the rotation shaft can be further inhibited. Since corrosion of the rotation shaft is inhibited, the frictional resistance between the power supply brush and the rotation shaft can be reduced, and rotation of the electrode roller can be stabilized. As a result, the quality of the metal porous body can be improved.

(3) In the method for producing a metal porous body according to the above (1) or (2), preferably, the rotation shaft has a core portion that is a material containing copper as a main component, a periphery of the copper is coated with a material containing iron as a main component, and further, a periphery of the material containing iron as a main component is coated with a material containing nickel as a main component.

According to the embodiment of the invention described in the above (3), since the core portion of the rotation shaft of the electrode roller is formed by a material containing copper as a main component, the electric resistance during supply of power to the electrode roller can be reduced. In addition, since the surface of the copper of the core portion of the rotation shaft is coated with iron, and the surface of the iron is further coated with nickel, the surface of the rotation shaft has high corrosion resistance, and even when the surface of the rotation shaft is abraded little by little, the copper of the core portion does not become exposed. Furthermore, since the difference between the ionization tendency of nickel and the ionization tendency of iron is smaller than the difference between the ionization tendency of nickel and the ionization tendency of copper, progress of corrosion due to contact between different types of metals can be delayed. Owing to the above, corrosion of the surface of the rotation shaft can be inhibited, rotation of the electrode roller can be stabilized, and further, the quality of the metal porous body can be improved.

(4) In the method for producing a metal porous body according to any one of the above (1) to (3), the power supply brush is preferably in sliding contact with the rotation shaft with a lubricant, not containing conductive metal powder, interposed therebetween.

According to the embodiment of the invention described in the above (4), the frictional resistance between the rotation shaft of the electrode roller and the power supply brush can be reduced, and rotation of the electrode roller can be stabilized.

Generally, in the case of applying a fluid between components for the purpose of applying electricity, a method in which a conductive material such as metal powder is mixed into the fluid to cause the fluid itself to have electrical conductivity, is adopted. However, if conductive metal powder is contained in a lubricant that corresponds to the fluid, when the lubricant is used over a long period of time, the metal powder in the lubricant may be oxidized, resulting in significant deterioration of electrical conductivity. In addition, by the metal powder aggregating into lumps and accumulating between the contact surface of the power supply brush and the rotation shaft of the electrode roller, the contact area between the contact surface and the rotation shaft of the electrode roller may be decreased.

On the other hand, according to the embodiment of the invention described in the above (4), since the lubricant does not contain conductive metal powder, deterioration of electrical conductivity due to oxidization of metal powder can be prevented. In addition, since metal powder can be prevented from aggregating into lumps and accumulating between the contact surface of the power supply brush and the rotation shaft of the electrode roller, a decrease in the contact area between the contact surface and the rotation shaft of the electrode roller can be prevented, and the contact area that is stable can be ensured.

(5) In the method for producing a metal porous body according to any one of the above (1) to (4), when the electrode roller is rotated, the rotation shaft is preferably immersed into a lubricant stored within a container that is disposed below the rotation shaft.

According to the embodiment of the invention described in the above (5), by rotating the electrode roller, the lubricant within the container can be applied to the entire outer circumference of the rotation shaft. Thus, with a simple configuration, the contact surface of the power supply brush that is in contact with the rotation shaft can be brought into sliding contact with the rotation shaft of the electrode roller with the lubricant interposed therebetween. In addition, since the container is disposed below the rotation shaft of the electrode roller, when abrasion powder generated on the contact surface of the power supply brush drops due to the weight thereof or the like, the dropping abrasion powder can be received within the container. Accordingly, the abrasion powder can be easily collected during maintenance work.

(6) In the method for producing a metal porous body according to any one of the above (1) to (5), heat generated in the power supply brush is preferably dissipated to the outside by a heat dissipation member connected to the power supply brush.

According to the embodiment of the invention described in the above (6), a rise in the temperature of the power supply brush can be effectively inhibited by the heat dissipation member, and thus corrosion of the power supply brush due to a rise in the temperature of the power supply brush can be inhibited.

(7) In the method for producing a metal porous body according to any one of the above (1) to (6), abrasion powder generated by abrasion of the power supply brush is preferably guided and discharged to the outside by a groove formed on a contact surface of the power supply brush that is in contact with the rotation shaft.

According to the embodiment of the invention described in the above (7), abrasion powder of the power supply brush can be inhibited from aggregating into lumps and accumulating between the rotation shaft and the contact surface of the power supply brush that is in contact with the rotation shaft. Furthermore, a decrease in the contact area between the contact surface and the rotation shaft of the electrode roller can be inhibited, and the contact area that is stable can be ensured.

(8) In the method for producing a metal porous body according to the above (7), the groove is preferably formed so as to extend in a direction crossing a tangent direction tangent to the rotation shaft.

According to the embodiment of the invention described in the above (8), since the abrasion powder can be efficiently guided and discharged to the outside by the groove, the abrasion powder can be further inhibited from aggregating into lumps and accumulating between the contact surface of the power supply brush and the rotation shaft of the electrode roller.

(9) In the method for producing a metal porous body according to any one of the above (1) to (8), the power supply brush is preferably biased and pressed against the rotation shaft by a biasing member.

According to the embodiment of the invention described in the above (9), the contact pressure between the contact surface of the power supply brush and the rotation shaft of the electrode roller can be increased by the biasing member.

(10) A plating apparatus according to an embodiment of the present invention is a plating apparatus for performing electroplating treatment on a surface of a skeleton of a conductive resin porous body obtained by forming a conductive layer on a surface of a skeleton of a sheet-like resin porous body having the skeleton with a three-dimensional network structure, to form a metal plating layer, the plating apparatus comprising:

a plating tank;

an electrode roller capable of supplying power to the conductive resin porous body by rotating a rotation shaft while feeding the conductive resin porous body to the plating tank; and a power supply brush configured to come into sliding contact with the rotation shaft of the electrode roller, wherein the power supply brush is formed by a material containing iron as a main component, and at least a surface of at least a part of the rotation shaft with which the power supply brush is in contact is formed by a material containing iron or nickel as a main component.

According to the embodiment of the invention described in the above (10), it is possible to provide a plating apparatus that can improve the quality and the productivity of a metal porous body. In addition, the plating apparatus according to the above (10) is a plating apparatus that can execute the method for producing a metal porous body according to the above (1).

In the plating apparatus, since the power supply brush is formed by a material containing iron as a main component, the abrasion resistance of the power supply brush is improved, the amount of abrasion powder generated from the power supply brush is reduced, and rotation of the electrode roller is stabilized. In addition, since at least the surface of the rotation shaft of the electrode roller is formed by a material containing iron or nickel as a main component, corrosion of the rotation shaft is inhibited, and rotation of the electrode roller is stabilized. Since jerkiness of the rotation shaft of the electrode roller is inhibited, the thickness of the metal plating layer formed on the surface of the skeleton of the conductive resin porous body is less varied. As a result, in the case of producing the metal porous body in which the thickness of the metal plating layer is small, cracking can be inhibited from occurring in the skeleton of the metal porous body thereby to reduce the strength of the metal porous body, and thus the quality of the metal porous body can be improved.

DETAILS OF EMBODIMENTS OF INVENTION

Hereinafter, embodiments of the present invention will be described in detail with reference to the accompanying drawings. It should be noted that at least parts of the embodiment described below may be combined as desired.
<Metal Porous Body>

FIG. 1 is a schematic diagram showing a metal porous body having a skeleton with a three-dimensional network structure (hereinafter, also referred to merely as a "metal porous body") which is obtained by a method for producing a metal porous body according to an embodiment of the present invention. The metal porous body 10 has sheet-like appearance and has a skeleton 11 forming a three-dimensional network structure. A large number of pores defined by the three-dimensional network structure are formed so as to be arranged from the surface of the metal porous body 10 to the interior of the metal porous body 10.

Figure 2:
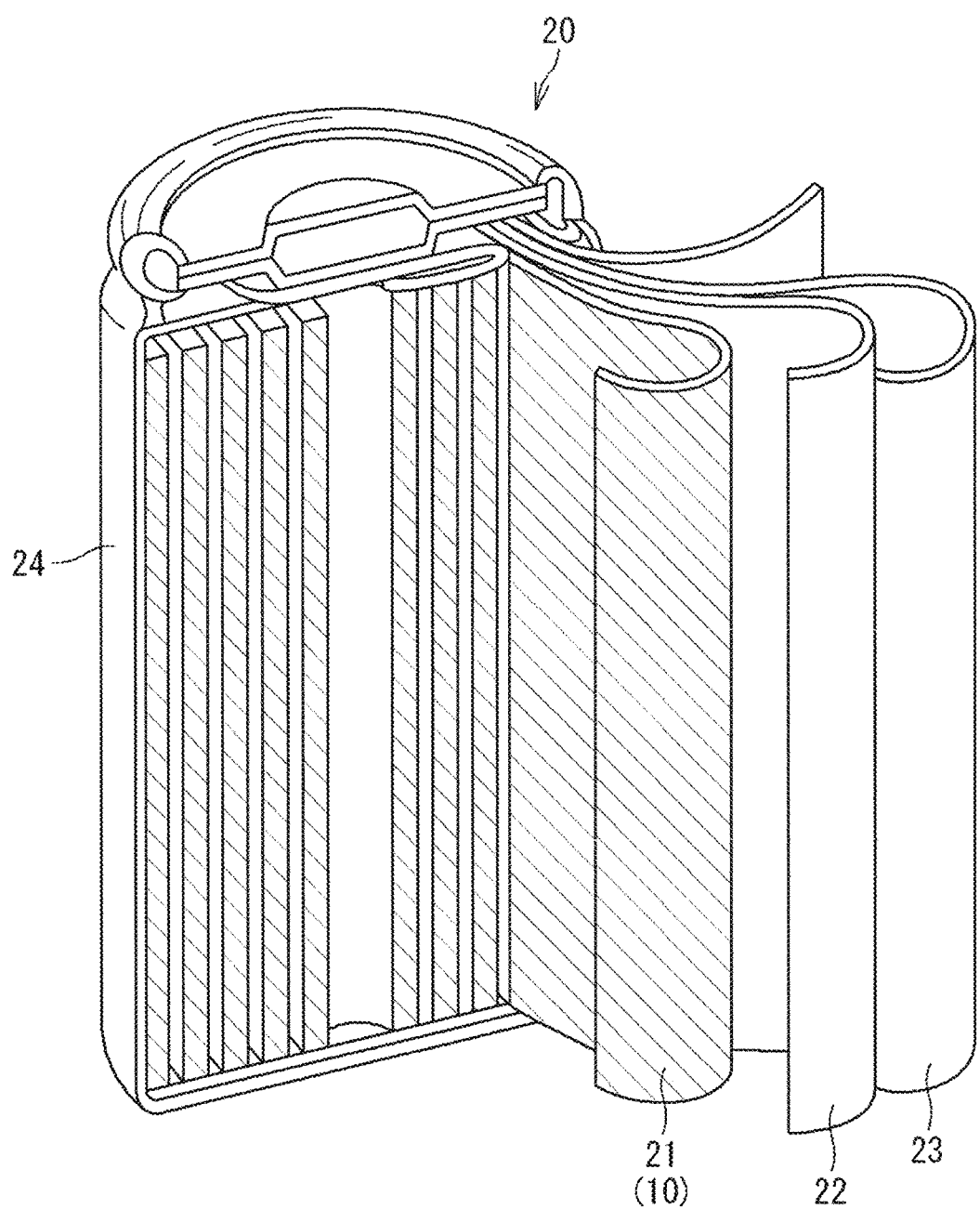
FIG. 2 is a schematic diagram showing a battery in which the metal porous body is used as a positive electrode plate.

The metal porous body 10 can be used, for example, as a positive electrode plate 21 of a battery 20 as shown in FIG. 2. That is, as shown in FIG. 2, the battery 20 in which the metal porous body 10 is used mainly includes the positive electrode plate 21, a separator 22, and a negative electrode plate 23 that are disposed within a casing 24. The positive electrode plate 21, the separator 22, and the negative electrode plate 23 are disposed within the casing 24 in a state of being layered. The layered body of the positive electrode plate 21, the separator 22, and the negative electrode plate 23 is held in a wound state. The positive electrode plate 21 includes the metal porous body 10 and an active material (not shown) with which the metal porous body 10 is filled.
<Production Process for Metal Porous Body>

Figure 3:
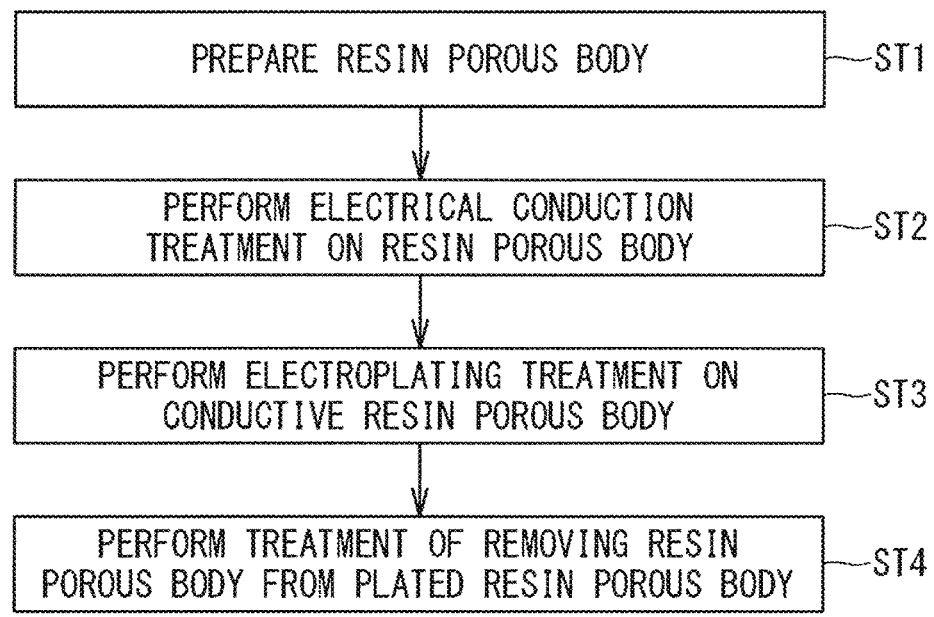
FIG. 3 is a flowchart showing a method for producing a metal porous body according to an embodiment of the present invention.

FIG. 3 is a flowchart showing the method for producing a metal porous body according to the embodiment of the present invention. Hereinafter, the flow of the entirety of the method for producing the metal porous body 10 will be described with reference to FIG. 3.

Figure 4A:
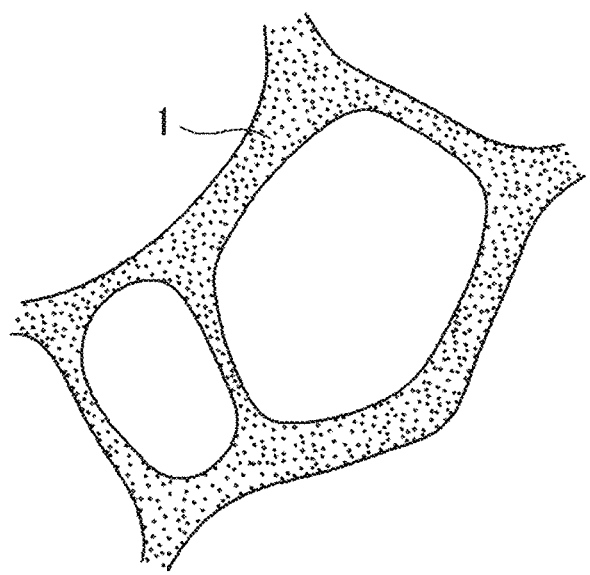
FIG. 4A is an enlarged schematic view of the surface of a resin porous body having a skeleton with a three-dimensional network structure.

First, a sheet-like resin porous body that has a skeleton with a three-dimensional network structure and serves as a base is prepared (step ST1). FIG. 4A is an enlarged schematic view of the surface of a resin porous body 1 serving as a base. In the resin porous body 1, a large number of pores defined by a three-dimensional network structure are formed so as to be arranged from the surface of the resin porous body 1 to the interior of the resin porous body 1.

Figure 4B:
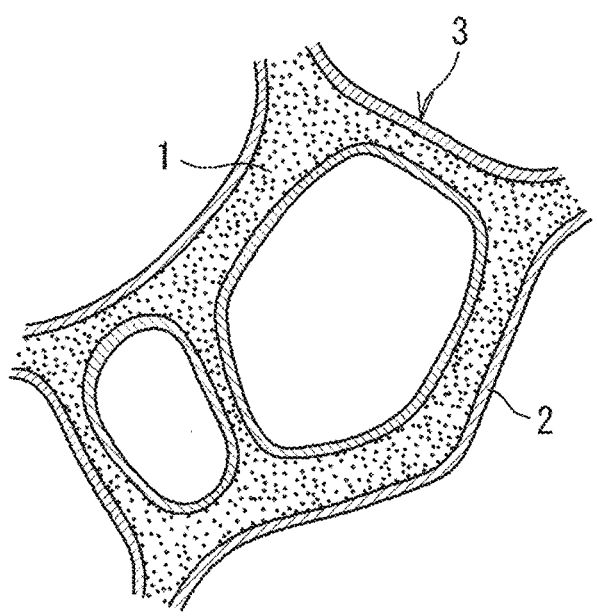
FIG. 4B is an enlarged schematic view of the surface of a conductive resin porous body having a skeleton with a three-dimensional network structure.

Next, electrical conduction treatment is performed on the surface of the skeleton of the resin porous body 1 (step ST2). By this step, a conductive resin porous body 3 having a conductive layer 2 formed by a thin electric conductor on the surface of the skeleton of the resin porous body 1 as shown in FIG. 4B can be obtained.

Figure 4C:
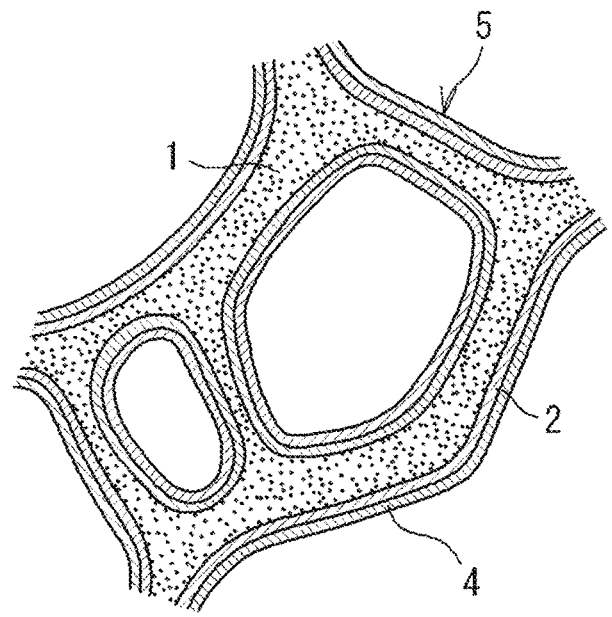
FIG. 4C is an enlarged schematic view of the surface of a resin porous body having a skeleton with a three-dimensional network structure.

Subsequently, electroplating treatment is performed on the surface of the skeleton of the conductive resin porous body 3 (step ST3). By this step, a plated resin porous body 5 having a metal plating layer 4 formed on the surface of the skeleton of the conductive resin porous body 3 as shown in FIG. 4C can be obtained.

Figure 4D:
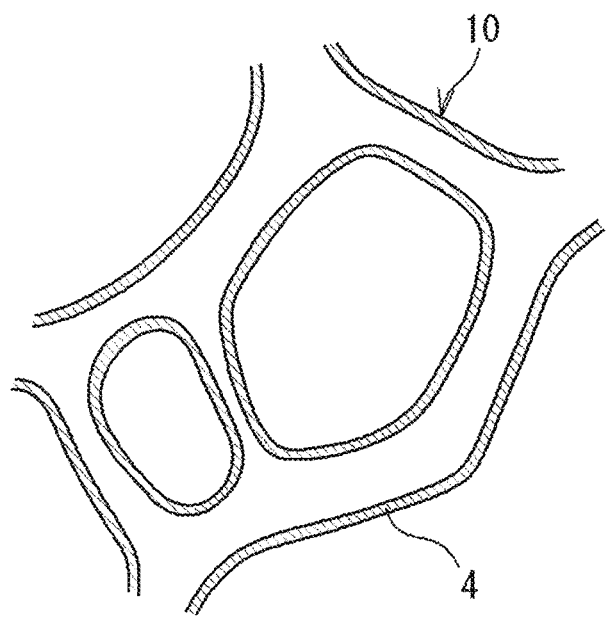
FIG. 4D is an enlarged schematic view of the surface of a metal porous body having a skeleton with a three-dimensional network structure.

Next, treatment of removing the resin porous body 1, which is the base, from the plated resin porous body 5 is performed (step ST4). In this removing treatment, the resin porous body 1 is eliminated by burning or the like, whereby the metal porous body 10 in which only the metal plating layer 4 is left can be obtained (see FIG. 4D). Hereinafter, each step will be sequentially described in detail.
<Preparation of Resin Porous Body>

The sheet-like resin porous body 1 having the skeleton with the three-dimensional network structure is prepared. Examples of the material of the resin porous body 1 include a resin foam, a nonwoven fabric, felt, and a woven fabric, and these materials may be combined as necessary. In addition, the material of the resin porous body 1 is not particularly limited, but a material that can be eliminated by burning after the metal plating layer 4 is formed on the surface of the skeleton by the electroplating treatment is preferable.

The material of the resin porous body 1 is preferably a flexible material, since a sheet-like material is particularly easily broken due to handling thereof if the rigidity of the material is high. In the present embodiment, a resin foam is preferably used as the material of the resin porous body 1. The resin foam only needs to be porous, and a known or commercially-available one can be used. Examples of such a material include foamed urethane and foamed styrene. Among them, foamed urethane is particularly preferable from the viewpoint of having a high porosity. The thickness, the porosity, and the average pore size of the resin foam are not particularly limited in the present invention, and can be set as appropriate according to use.

The thickness of the resin foam is, for example, not less than 1.0 mm and not greater than 2.5 mm, preferably not less than 1.0 mm and not greater than 1.6 mm, and more preferably not less than 1.0 mm and not greater than 1.3 mm.

In addition, the average pore size of the resin foam is, for example, not less than 250 μm and not greater than 500 μm, preferably not less than 300 μm and not greater than 450 μm, and more preferably not less than 300 μm and not greater than 400 μm.

<Electrical Conduction Treatment>

Next, for performing electroplating treatment, electrical conduction treatment is performed in advance on the surface of the skeleton of the resin porous body 1. The method for the electrical conduction treatment is not particularly limited as long as the conductive layer 2 can be formed on the surface of the skeleton of the resin porous body 1. Examples of the material for forming the conductive layer 2 include metals such as nickel, titanium, and stainless steel, and carbon powder such as graphite and amorphous carbon including carbon black, etc. Among them, particularly, carbon powder is preferable, and carbon black is more preferable. The conductive layer 2 only needs to be continuously formed on the surface of the skeleton of the resin porous body 1. The weight of the conductive layer 2 per unit area is not particularly limited, and may be normally not less than about 5 g/m$^2$ and not greater than about 15 g/m$^2$, and preferably not less than about 7 g/m$^2$ and not greater than about 10 g/m$^2$.

As specific examples of the electrical conduction treatment, for example, in the case of using nickel, electroless plating treatment, sputtering treatment, and the like are preferable. In addition, in the case of using a material such as carbon black, graphite, or a metal such as titanium and stainless steel, treatment in which a mixture obtained by adding a binder to fine powder of the material is applied to the surface of the skeleton of the resin porous body 1 is preferable.

As the electroless plating treatment using nickel, for example, the resin porous body 1 may be immersed into a known electroless nickel plating bath such as a nickel sulfate aqueous solution containing sodium hypophosphite as a reducing agent. Before the immersion into the plating bath, the resin porous body 1 may be immersed as necessary into an activation liquid containing a very small amount of palladium ions (a cleaning liquid manufactured by JAPAN KANIGEN Co., Ltd.) or the like.

As the sputtering treatment using nickel, for example, the resin porous body 1 may be attached to a substrate holder, then a DC voltage may be applied between the substrate holder and a target (nickel) while inert gas is being introduced, whereby ionized inert gas may be collided against the nickel, and the blown nickel particles may be accumulated on the surface of the skeleton of the resin porous body 1.

<Electroplating Treatment>

When the thickness of the metal plating layer is increased by at least one of the above electroless plating treatment and the above sputtering treatment, it is not necessary to perform electroplating treatment. However, from the viewpoint of productivity and cost, a method is preferably adopted in which, as described above, first, electrical conduction treatment is performed on the resin porous body 1, and then the metal plating layer 4 is formed on the surface of the skeleton of the conductive resin porous body 3 by electroplating treatment.

The electroplating treatment only needs to be performed according to an ordinary method. For example, in the case of nickel plating, a known or commercially-available one can be used as a plating bath. Examples of the plating bath include a Watts bath, a chlorination bath, and a sulfamic acid bath. In the above electroless plating treatment or sputtering treatment, the conductive resin porous body 3 is immersed into the plating bath, the conductive resin porous body 3 and a counter electrode plate of a plating metal are connected to a cathode and an anode, respectively, and a DC or pulse interrupted current is applied thereto, whereby the metal plating layer 4 can be further formed on the conductive layer 2 on the surface of the skeleton of the conductive resin porous body 3. The metal plating layer 4 only needs to be formed on the conductive layer 2 such that the conductive layer 2 is not exposed (see FIG. 4C).

FIG. 5 is a side cross-sectional view showing an example of a plating apparatus 30 that continuously performs electroplating treatment on the sheet-like conductive resin porous body 3. The plating apparatus 30 of the present embodiment is configured to feed the sheet-like conductive resin porous body 3 from the left side to the right side in FIG. 5, and includes a first plating tank 31, a second plating tank 32 disposed at the downstream side of the first plating tank 31, and a power supply device 50 (see FIG. 7).

The first plating tank 31 includes a plating bath 33, a cylindrical electrode 34 (cylindrical cathode), and an anode 35 (cylindrical anode) provided on an inner wall of a container. By the conductive resin porous body 3 passing through the inside of the plating bath 33 along the cylindrical electrode 34, the metal plating layer 4 is formed on one surface side (the lower surface side in FIG. 5) of the conductive resin porous body 3.

The second plating tank 32 includes a plurality of tanks 36 for forming the metal plating layer 4 on the other surface side (the upper surface side in FIG. 5) of the conductive resin porous body 3. The conductive resin porous body 3 undergoes metal plating by being sequentially fed and passing through plating baths 39 in a state of being held between a plurality of feeding rollers 37 and a plurality of electrode rollers 38, which are disposed adjacent to the respective tanks 36. In each of the plurality of tanks 36, an anode 40 is provided at the other surface side of the conductive resin porous body 3 with the plating bath 39 interposed therebetween. By supplying power to the anodes 40 and rotation shafts 38*a* of the electrode rollers 38 (tank-outer power supply cathodes), the metal plating layer 4 is formed on the other surface side of the conductive resin porous body 3.

Figure 6:
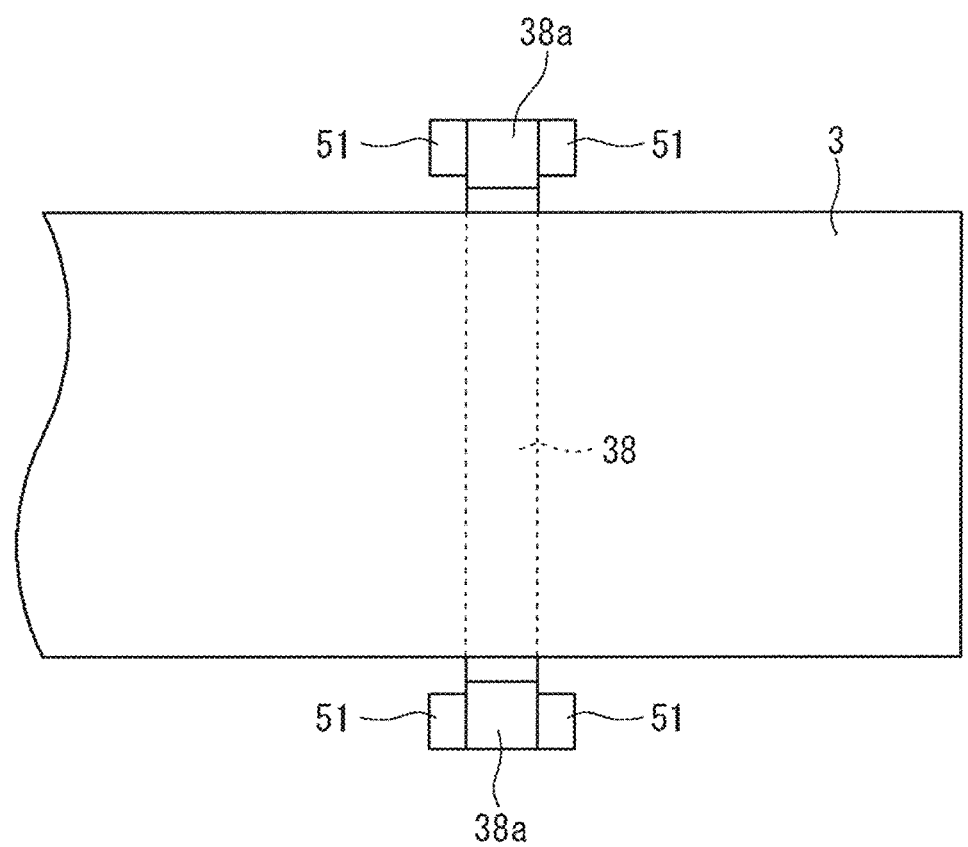
FIG. 6 is a plan view showing a structure for supplying power to an electrode roller.

FIG. 6 is a plan view showing a structure for supplying power to the rotation shafts 38*a* of the electrode roller 38. The rotation shafts 38*a* of the electrode roller 38 are provided at both axial end portions of the electrode roller 38 which rotates in contact with the sheet-like conductive resin porous body 3. Each of the rotation shafts 38*a* of each electrode roller 38 is supplied with power by a plurality of power supply brushes 51 each of which is in sliding contact with a part of the outer circumferential surface of the rotation shaft 38*a*.

Each power supply brush 51 is formed by a material containing iron as a main component, such that a large current can be applied to the rotation shaft 38*a* of the electrode roller 38. In addition, the power supply brush 51 is designed such that the power supply brush 51 is abraded against the rotation shaft 38*a* of the electrode roller 38. Conventionally, a power supply brush made of copper, which has low abrasion resistance, is used. However, in the present embodiment, since the power supply brush 51 is formed by a material containing iron, which has excellent abrasion resistance, as a main component, the amount of abrasion powder generated can be reduced. Since the amount of abrasion powder generated from the power supply brush 51 is small, rotation of the electrode roller can be stabilized. In addition, progress of abrasion of the power supply brush 51 is slow, and thus the frequency of replacement of the power supply brush 51 can be also reduced.

In the case where the power supply brush 51 and the rotation shaft 38a are in contact with each other with a later-described lubricant interposed therebetween, the power supply brush 51 is preferably formed by a sintered body.

At least the surface of each rotation shaft 38a of each electrode roller 38 is formed by a material containing iron or nickel as a main component, and thus has excellent abrasion resistance and excellent corrosion resistance. To further enhance the corrosion resistance of the rotation shaft 38a, the rotation shaft 38a is preferably formed by a material that contains iron as a main component and whose periphery is coated with a material containing nickel as a main component. Since nickel has better corrosion resistance than iron, the corrosion resistance of the rotation shaft 38a can be further enhanced. Furthermore, since the difference between the ionization tendency of iron and the ionization tendency of nickel is small, progress of corrosion due to contact between different types of metals can be delayed.

To decrease the electric resistance of each rotation shaft 38a of each electrode roller 38, preferably, a core portion of the rotation shaft 38a is formed by a material containing copper as a main component, the periphery of the material containing copper as a main component is coated with a material containing iron as a main component, and the periphery of the material containing iron as a main component is further coated with a material containing nickel as a main component. Since the core portion of the rotation shaft 38a is formed by the material containing copper as a main component, the electric resistance during supply of power from the rotation shaft 38a to the electrode roller 38 can be reduced. In addition, since the surface of the rotation shaft 38a is formed by the material containing nickel as a main component, the rotation shaft 38a has excellent corrosion resistance. Furthermore, even when the nickel in the surface of the rotation shaft 38a is gradually abraded, since the material containing iron as a main component is present under the nickel, the copper of the core portion can be prevented from being exposed. Furthermore, since the difference between the ionization tendency of nickel and the ionization tendency of iron is smaller than the difference between the ionization tendency of nickel and the ionization tendency of copper, progress of corrosion due to contact between different types of metals can be delayed.

Each power supply brush 51 is designed such that the power supply brush 51 is abraded against the rotation shaft 38a of the electrode roller 38. The coefficient of dynamic friction of each power supply brush 51 is not less than 0.01 and not greater than 0.40, and preferably not less than 0.10 and not greater than 0.30. In the case where the coefficient of dynamic friction of the power supply brush 51 is not less than 0.01, the power supply brush can be obtained at relatively low cost. In addition, when the coefficient of dynamic friction of the power supply brush 51 is not greater than 0.40, the slidability of the power supply brush 51 is improved, so that an amount of abrasion of the power supply brush 51 can be reduced.

Figure 7:
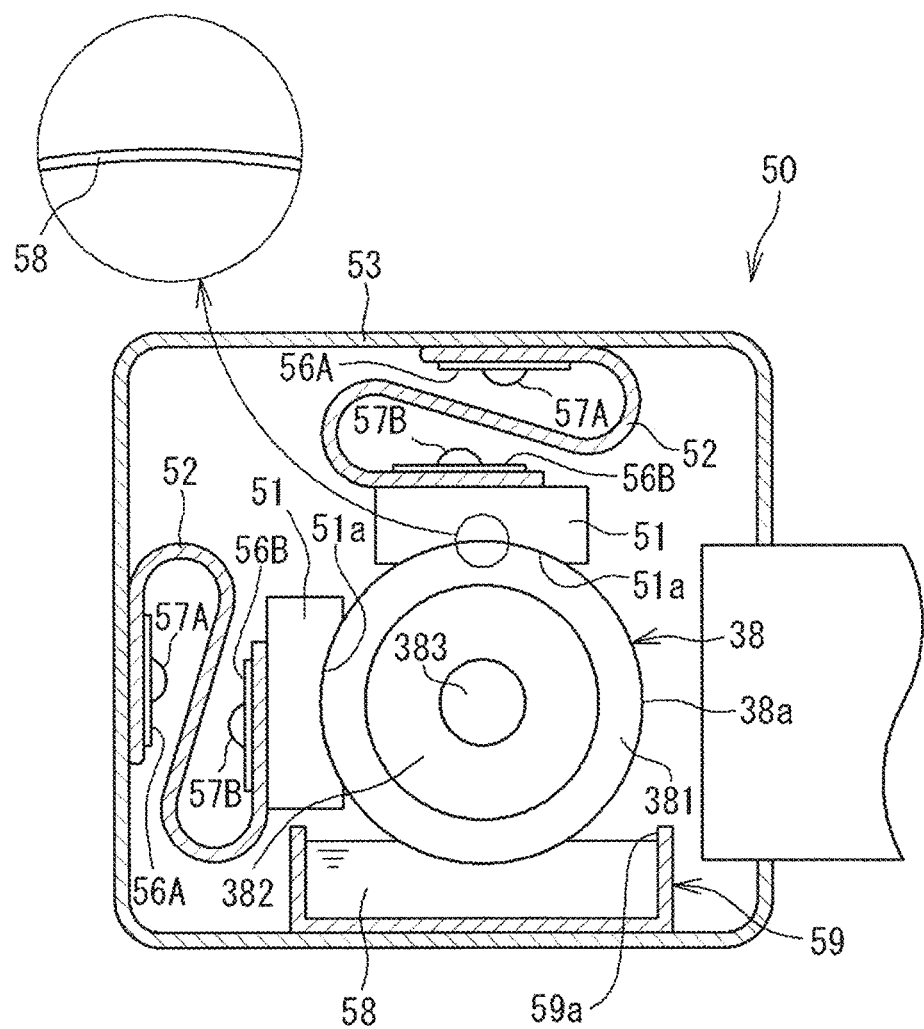
FIG. 7 is a cross-sectional view showing a power supply device.

FIG. 7 is a cross-sectional view showing the power supply device 50 including the plurality of power supply brushes 51. The power supply device 50 is provided at each of both axial end portions of the electrode roller 38. The power supply device 50 of the present embodiment includes the plurality of (in this example, two) power supply brushes 51, a plurality of biasing members 52 that press and bias the respective power supply brushes 51 against the outer circumferential surface of the rotation shaft 38a of the electrode roller 38, and a casing 53.

In the power supply device 50 shown in FIG. 7, the core portion of the rotation shaft 38a of the electrode roller 38 is formed by a material 383 containing copper as a main component. The periphery of the material 383 containing copper as a main component is coated with a material 382 containing iron as a main component, and the periphery of the material 382 containing iron as a main component is coated with a material 381 containing nickel as a main component.

The casing 53 is formed, for example, by a metal member having electric conductivity. The casing 53 of the present embodiment is formed in a rectangular cross-sectional shape so as to surround the rotation shaft 38a of the electrode roller 38, and the biasing members 52 are attached to two surfaces, that is, the upper surface and the left surface, among four inner surfaces of the casing 53.

Each biasing member 52 is not particularly limited as long as the biasing member 52 presses and biases the power supply brush 51 against the outer circumferential surface of the rotation shaft 38a of the electrode roller 38. For example, each biasing member 52 of the present embodiment is formed by a plate spring that is bent in an S cross-sectional shape. One end portion of each biasing member 52 is attached to the corresponding inner surface of the casing 53, for example, by a fixing plate 56A and a bolt 57A, and the power supply brush 51 is connected to the other end portion of each biasing member 52, for example, by a fixing plate 56B and a bolt 57B. Accordingly, contact surfaces 51a (described later) of the two power supply brushes 51 are pressed against the outer circumferential surface of the rotation shaft 38a of the electrode roller 38 from the upper side and the left side in FIG. 7 by the biasing force of the corresponding biasing members 52.

Each biasing member 52 is preferably formed by a metal member having both excellent electric conductivity and excellent heat dissipation. Each biasing member 52 in the plating apparatus of the present embodiment is formed by a metal member obtained by tinning copper having electric conductivity and having excellent heat dissipation. In addition, in the present embodiment, the fixing plates 56A and 56B also have heat dissipation. Thus, the biasing member 52 and the fixing plates 56A and 56B serve as a heat dissipation member that dissipates heat generated in the power supply brush 51 connected to this biasing member 52, to the outside. The heat dissipation member connected to the power supply brush 51 may be formed by a member other than the biasing member 52 and the fixing plates 56A and 56B, or may be formed by the biasing member 52, the fixing plates 56A and 56B, and the casing 53.

In each power supply brush 51, a surface that faces the outer circumferential surface of the rotation shaft 38a of the electrode roller 38 is the contact surface 51a that is in sliding contact with the outer circumferential surface. The contact surface 51a is formed in a circular arc shape along the outer circumferential surface of the rotation shaft 38a of the electrode roller 38. In addition, a lubricant 58 not containing conductive metal powder is preferably applied to the contact surface 51a. "Not containing conductive metal powder" means to include not only the case where conductive metal powder is not contained at all but also the case where conductive metal powder is contained in a certain amount such that the advantageous effects of the present embodiment are achieved.

As the lubricant 58, a lubricating oil that is a liquid, or grease is used. In the present embodiment, liquid paraffin, which is a lubricating oil, is used as the lubricant 58. Here, paraffin is a type of hydrocarbon compound (organic compound), is a generic term for alkanes having 20 or more carbon atoms (chain saturated hydrocarbons having the general formula of $C_nH_{2n+2}$), and is considered synonymous for aliphatic saturated hydrocarbons $C_nH_{2n+2}$ in some cases regardless of the number of carbon atoms. In addition, paraffin is a mixture of hydrocarbons obtained from petroleum or crude oil through processes such as distillation and refinement and is a colorless and transparent liquid. Liquid paraffin can be considered as a pure hydrocarbon since liquid paraffin is highly purified by removing impurities such as aromatic hydrocarbons and sulfur compounds contained in lube-oil distillate of petroleum that is a raw material.

In the method for producing a metal porous body according to the embodiment of the present invention, the liquid paraffin is a mixture (weight-average molecular weight: 483) of hydrocarbons (the number of carbon atoms is not less than about 15 and not greater than about 20), and a reagent having a purity of about 95% equivalent to first class grade is preferably used. In addition, the density of the liquid paraffin is preferably not less than 0.855 g/ml, and is, for example, 0.87 g/ml in the present embodiment.

When a low viscosity is defined as being not less than 40 cSt and not greater than 75 cSt, an intermediate viscosity is defined as being not less than 75 cSt and not greater than 300 cSt, and a high viscosity is defined as not less than 300 cSt, the viscosity of the liquid paraffin is preferably the low viscosity to the lower limit of the intermediate viscosity from the viewpoint of easy handling. In the present embodiment, the viscosity of the liquid paraffin is, for example, 75.8 cSt, and the kinetic viscosity of the liquid paraffin is, for example, 67.65 cSt ($mm^2/s$ at 40° C.)

The lubricant 58 is stored within a container 59 that is disposed on the lower surface within the casing 53 and below the rotation shaft 38a of the electrode roller 38. An opening 59a is formed at the upper side of the container 59. A part of the outer circumference of the rotation shaft 38a of the electrode roller 38 is immersed in the lubricant 58 within the container 59 through the opening 59a. Accordingly, by rotating the electrode roller 38, the lubricant 58 within the container 59 is applied to the entirety of the outer circumferential surface of the rotation shaft 38a. Thus, each power supply brush 51 can supply power to the rotation shaft 38a by bringing the contact surface 51a of the power supply brush 51 into sliding contact with the outer circumferential surface of the rotation shaft 38a with the lubricant 58 interposed therebetween. In addition, when abrasion powder generated on the contact surface 51a of each power supply brush 51 drops due to the weight thereof or the like, the dropping abrasion powder can be received within the container 59 through the opening 59a.

Figure 8A:
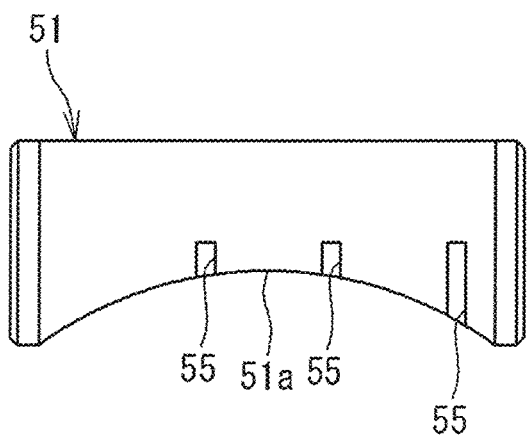
FIG. 8A is a side view showing a power supply brush.
Figure 8B:
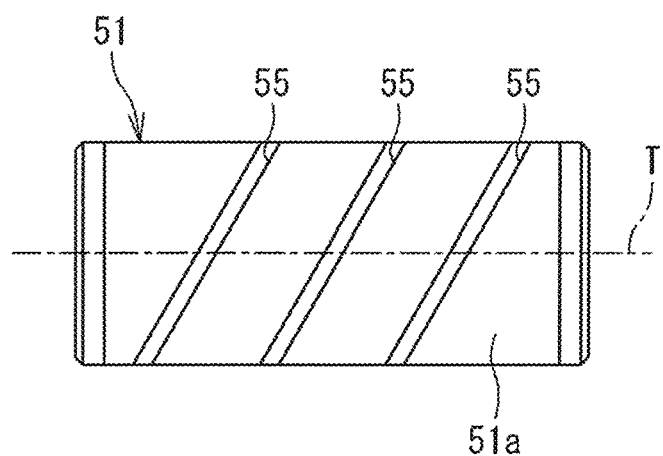
FIG. 8B is a diagram of the power supply brush as seen from the lower side of FIG. 8A.

FIG. 8A is a side view showing the power supply brush 51. In addition, FIG. 8B is a diagram of the power supply brush 51 as seen from the lower side in FIG. 8A. As shown in FIG. 8A and FIG. 8B, a plurality of (in this example, three) slit-shaped grooves 55 are formed on the contact surface 51a of the power supply brush 51. These grooves 55 are formed on the contact surface 51a at regular intervals in the longitudinal direction of the contact surface 51a (the right-left direction in FIG. 8A and FIG. 8B).

Each groove 55 is formed so as to extend in a direction crossing a tangent direction T (see FIG. 8B) in which the contact surface 51a of the power supply brush 51 is tangent to the rotation shaft 3.8a of the electrode roller 38. In the present embodiment, each groove 55 is formed so as to extend linearly over the entirety of the contact surface 51a in the lateral direction of the contact surface 51a (the up-down direction in FIG. 8A and FIG. 8B) in a state of being inclined at a predetermined angle (for example, 30°) relative to the lateral direction. Accordingly, abrasion powder generated on the contact surface 51a of the power supply brush 51 due to sliding contact with the rotation shaft 38a of the electrode roller 38 can be efficiently guided and discharged to the outside by the plurality of grooves 55.

The current density during supply of power from each power supply brush 51 to the rotation shaft 38a of the electrode roller 38 (the ratio of the current to the total cross-sectional area of the power supply brush 51) is not less than about 5 $A/cm^2$ and not greater than about 15 $A/cm^2$ and preferably not less than 8 $A/cm^2$ and not greater than 13 $A/cm^2$. When the current density is not less than 5 $A/cm^2$, the entirety of the power supply device 50 can be reduced. In addition, since the distance from the power supply device 50 to the corresponding tank 36 is short, voltage loss can be reduced. When the current density is not greater than 15 $A/cm^2$, a rise in the temperature of the power supply brush 51 can be inhibited.

The weight of the metal plating layer 4 per unit area is not particularly limited, and is normally not less than about 150 $g/m^2$ and not greater than about 400 $g/m^2$, and the sum of the weight of the conductive layer 2 per unit area and the weight of the metal plating layer 4 per unit area is preferably not less than 200 $g/m^2$ and not greater than 350 $g/m^2$. When the above sum of the weights per unit area is not less than 150 $g/m^2$, desired strength of the metal porous body can be ensured. When the above sum of the weights per unit area is not greater than 400 $g/m^2$, heat generation of the power supply brush can be inhibited.

The electroplating treatment is not limited to the electroplating treatment of the present embodiment, and, for example, a plating treatment method using a preliminary plating tank or a plating treatment method using a preliminary plating tank and a lift type main plating tank may be adopted.

Figure 9:
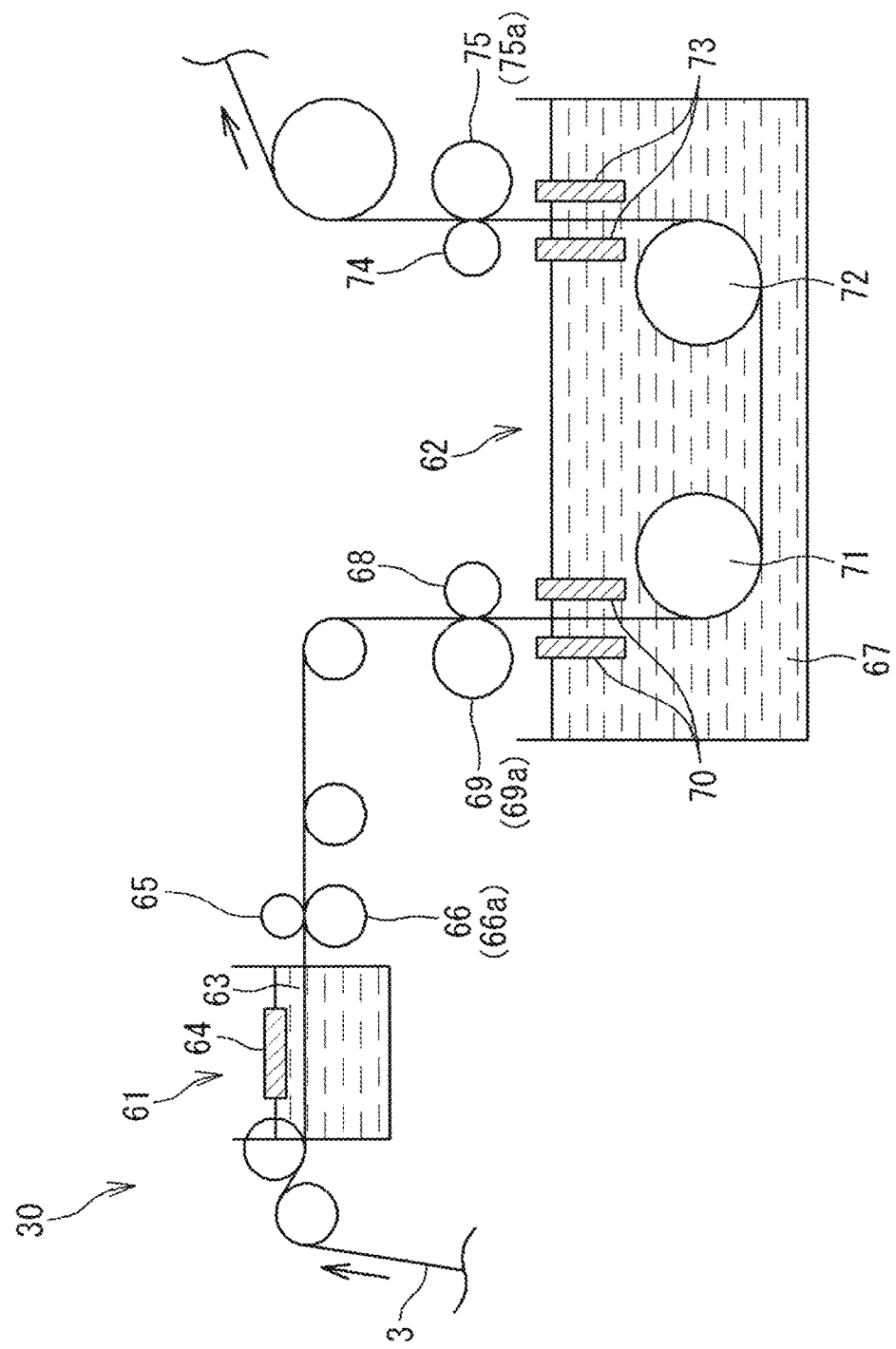
FIG. 9 is a schematic diagram showing a modification of the plating apparatus.

FIG. 9 is a schematic diagram showing a modification of the plating apparatus 30. In the present modification, the plating apparatus 30 includes a preliminary plating tank 61 and a lift type main plating tank 62 disposed at the downstream side of the preliminary plating tank 61.

The preliminary plating tank 61 includes a plating bath 63, an anode 64 (cylindrical anode), a presser roller 65, and an electrode roller 66 having a rotation shaft 66a (power supply cathode) at each end portion thereof. The conductive resin porous body 3 preliminarily undergoes plating on one side surface (the upper surface side in FIG. 9) of the conductive resin porous body 3 by being sequentially fed and passing through the inside of the plating bath 63 in a state of being held between the presser roller 65 and the electrode roller 66, The main plating tank 62 includes a plating bath 67, a first presser roller 68, a first electrode roller 69 having a rotation shaft 69a (power supply cathode) at each end portion thereof, a pair of first anodes 70 (cylindrical anodes), a first feeding roller 71, a second feeding roller 72, a pair of second anodes 73 (cylindrical anodes), a second presser roller 74, and a second electrode roller 75 having a rotation shaft 75a (power supply cathode) at each end portion thereof.

In the main plating tank 62, the conductive resin porous body 3 is sequentially drawn in between the pair of first anodes 70 within the plating bath 67 in a state of being held between the first presser roller 68 and the first electrode roller 69. At this time, plating is performed on both surface sides of the conductive resin porous body 3 by supplying power to the rotation shafts 69a of the first electrode roller 69 and the pair of first anodes 70.

Next, the conductive resin porous body 3 is sequentially fed between the pair of second anodes 73 by the first feeding roller 71 and the second feeding roller 72 within the plating bath 67. Then, the conductive resin porous body 3 is sequentially lifted from the inside of the plating bath 67 in a state of being held between the second presser roller 74 and the second electrode roller 75. At this time, plating is performed on both surface sides of the conductive resin porous body 3 by supplying power to the pair of second anodes 73 and the rotation shafts 75a of the second electrode roller 75.

The rotation shafts 66a of the electrode roller 66 of the preliminary plating tank 61 are supplied with power by power supply brushes (not shown) that are in sliding contact with the rotation shafts 66a. Similarly, the rotation shafts 69a and the rotation shafts 75a of the first electrode roller 69 and the second electrode roller 75 of the main plating tank 62 are supplied with power by power supply brushes (not shown) that are in sliding contact with the rotation shafts 69a and the rotation shafts 75a.

The power supply brushes that supply power to the rotation shafts 66a, 69a, and 75a of the respective electrode rollers 66, 69, and 75 are formed similar to the above embodiment, and thus the description thereof is omitted.

<Treatment of Removing Resin Porous Body>

Treatment of removing the resin porous body 1 from the plated resin porous body 5 (see FIG. 4C) obtained by the electroplating treatment is performed. In this removing treatment, for example, the resin porous body 1 is removed from the plated resin porous body 5 in an acidic atmosphere such as atmospheric air not lower than about 600° C. and not higher than 800° C. and preferably not lower than 600° C. and not higher than 700° C., and then heating is performed in a reductive atmosphere at 750° C. or higher (higher temperatures are desirable but the temperature is preferably not higher than 1000° C., since higher temperatures are disadvantageous in cost, or from the viewpoint of the material of the body of a reducing furnace). As reductive gas, hydrogen gas or mixed gas of hydrogen and carbon dioxide or inert gas can be used, or these gases can be also used in combination as necessary. In particular, it is preferred if hydrogen gas is always added to reductive gas, since the efficiency of redox is improved.

As described above, in the method for producing a metal porous body according to the present embodiment and the plating apparatus, since each power supply brush 51 is formed by a material containing iron as a main component, the abrasion resistance of the power supply brush 51 is improved, and, in the electroplating treatment, the amount of abrasion powder generated from the power supply brush 51 is reduced, and rotation of each electrode roller 38 is stabilized. In addition, since at least the surface of each rotation shaft 38a of each electrode roller 38 is formed by a material containing iron or nickel as a main component, corrosion of the rotation shaft 38a is inhibited, and rotation of the electrode roller 38 is stabilized. Since jerkiness of each rotation shaft 38a of each electrode roller 38 is inhibited, the thickness of the metal plating layer 4 formed on the surface of the skeleton of the conductive resin porous body 3 is less varied. As a result, in the case of producing the metal porous body 10 in which the thickness of the metal plating layer 4 is small, cracking can be inhibited from occurring in the skeleton of the metal porous body 10 thereby to reduce the strength of the metal porous body 10, and thus the quality of the metal porous body 10 can be improved.

In the case where each rotation shaft 38a is formed by a material that contains iron as a main component and whose periphery is coated with a material containing nickel as a main component, progress of corrosion due to contact between different types of metals can be delayed, since the difference between the ionization tendency of iron and the ionization tendency of nickel is small. Furthermore, since nickel has better corrosion resistance than iron, corrosion of the rotation shaft 38a can be further inhibited. Since corrosion of the rotation shaft 38a is inhibited, the frictional resistance between each power supply brush 51 and the rotation shaft 38a can be reduced, and rotation of the electrode roller 38 can be stabilized. As a result, the quality of the metal porous body 10 can be improved.

In the case where the core portion of each rotation shaft 38a is a material containing copper as a main component, the periphery of the copper is coated with a material containing iron as a main component, and further, the periphery of the material containing iron as a main component is coated with a material containing nickel as a main component, the electric resistance during supply of power to the electrode roller 38 can be reduced. The surface of the rotation shaft 38a has high corrosion resistance, and even when the surface of the rotation shaft 38a is abraded little by little, the material that contains copper as a main component and is the core portion does not become exposed. Furthermore, since the difference between the ionization tendency of nickel and the ionization tendency of iron is smaller than the difference between the ionization tendency of nickel and the ionization tendency of copper, progress of corrosion due to contact between different types of metals can be delayed. Owing to the above, corrosion of the surface of each rotation shaft 38a can be inhibited, rotation of each electrode roller 38 can be stabilized, and further, the quality of the metal porous body 10 can be improved.

Since each power supply brush 51 is in sliding contact with the rotation shaft 38a with the lubricant, not containing conductive metal powder, interposed therebetween, the frictional resistance between the power supply brush 51 and the rotation shaft 38a of the electrode roller 38 can be reduced, and rotation of the electrode roller 38 can be stabilized. Since the lubricant 58 does not contain conductive metal powder, deterioration of the electrical conductivity of the lubricant due to oxidization of metal powder does not occur. In addition, since metal powder does not aggregate into lumps and accumulate between the contact surface 51a of the power supply brush 51 and the rotation shaft 38a of the electrode roller 38, a decrease in the contact area between the contact surface 51a and the rotation shaft 38a of the electrode roller 38 can be prevented, and the contact area that is stable can be ensured.

By rotating each electrode roller 38, the lubricant 58 within the container 59 can be applied to the entirety of the outer circumferential surface of the rotation shaft 38a. Thus, with a simple configuration, the contact surface 51a of each power supply brush 51 can be brought into sliding contact with the rotation shaft 38a of the electrode roller 38 with the lubricant 58 interposed therebetween. In addition, since the container 59 is disposed below the rotation shaft 38a of the electrode roller 38, when abrasion powder generated on the contact surface 51a of the power supply brush 51 drops due to the weight thereof or the like, the dropping abrasion powder can be received within the container 59 through the opening 59a. Accordingly, the abrasion powder can be easily collected during maintenance work.

In the electroplating treatment, heat generated in each power supply brush 51 can be dissipated to the outside by the biasing member 52 and the fixing plates 56A and 56B connected to the power supply brush 51. Accordingly, a rise in the temperature of the power supply brush 51 can be effectively inhibited, and thus corrosion of the power supply brush 51 due to a rise in the temperature of the power supply brush 51 can be inhibited.

In the electroplating treatment, abrasion powder generated on the contact surface 51a of each power supply brush 51 can be guided and discharged to the outside by the grooves 55 formed on the contact surface 51a. Accordingly, the abrasion powder can be inhibited from aggregating into lumps and accumulating between the contact surface 51a of the power supply brush 51 and the rotation shaft 38a of the electrode roller 38. Thus, a decrease in the contact area between the contact surface 51a and the rotation shaft 38a of the electrode roller 38 can be inhibited, and the contact area that is stable can be ensured.

Since each groove 55 is formed so as to extend in the direction crossing the tangent direction T in which the contact surface 51a of the power supply brush 51 is tangent to the rotation shaft 38a of the electrode roller 38, the abrasion powder can be efficiently guided and discharged to the outside by the groove 55. Accordingly, the abrasion powder can be further inhibited from aggregating into lumps and accumulating between the contact surface 51a of the power supply brush 51 and the rotation shaft 38a of the electrode roller 38.

The power supply brushes 51 are disposed at the respective rotation shafts 38a provided at both axial end portions of the electrode roller 38, and power is supplied to each rotation shaft 38a, in the electroplating treatment, while the contact surfaces 51a of the corresponding power supply brushes 51 are brought into sliding contact with the rotation shaft 38a with the lubricant 58 interposed therebetween. Accordingly, at the time of supply of power, it is possible to adjust the current density to be in an appropriate range via the power supply brushes 51, which are disposed at the respective rotation shafts 38a provided at both axial end portions of the electrode roller 38.

In the electroplating treatment, since each power supply brush 51 is biased and pressed against the rotation shaft 38a of the electrode roller 38 by the biasing member 52, the contact pressure between the contact surface 51a of the power supply brush 51 and the rotation shaft 38a of the electrode roller 38 can be increased.

In addition, since the contact pressure can be increased by the biasing member 52, in the case where each power supply brush 51 is composed of a sintered body, also due to recesses and projections being formed on the surface of the power supply brush 51, even if the lubricant 58 not containing conductive metal powder is used, a layer of the lubricant 58 becomes partially thin (at a portion where each local projection of the power supply brush 51 and the electrode roller 38 are in contact with each other). Thus, even with the lubricant 58 not containing conductive metal powder, flow of a current can be inhibited from being blocked. Therefore, in the present embodiment, more significant effects are achieved by using a sintered body as each power supply brush, increasing the contact pressure between the contact surface of the power supply brush 51 and the rotation shaft 38a of the electrode roller 38 by the biasing member 52, and combining the use of the lubricant 58 not containing conductive metal powder.

[Others]

Although the method for producing a metal porous body according to the above embodiment has been described for the case of application to a method for producing a metal porous body that is used as an electrode of a battery, the use of the metal porous body is not necessarily limited to an electrode of a battery, and the method may be applied to a method for producing a metal porous body that is used as a filter, a catalyst support, a metal composite, or the like that requires heat resistance. However, it is particularly effective to apply the method for producing a metal porous body according to the above embodiment to a method for producing a metal porous body that is used as an electrode of a battery.

It should be noted that the embodiments disclosed herein are to be considered in all respects as illustrative and not restrictive. The scope of the present invention is defined by the scope of the claims rather than by the meaning described above, and all changes which come within the meaning and range of equivalency of the claims are therefore intended to be embraced therein.

REFERENCE SIGNS LIST 1 resin porous body
2 conductive layer
3 conductive resin porous body
4 metal plating layer
5 plated resin porous body
10 metal porous body
11 skeleton
20 battery
21 positive electrode plate
22 separator
23 negative electrode plate
24 casing
30 plating apparatus
31 first plating tank
32 second plating tank
33 plating bath
34 cylindrical electrode
35 anode
36 tank
37 feeding roller
38 electrode roller
38a rotation shaft
381 material containing nickel as main component
382 material containing iron as main component
383 material containing copper as main component
39 plating bath
40 anode
50 power supply device
51 power supply brush
51a contact surface
52 biasing member (heat dissipation member)
53 casing
55 groove
56A, 56B fixing plate (heat dissipation member)
57A, 57B bolt
58 lubricant
59 container
59a opening
61 preliminary plating tank
62 main plating tank
63 plating bath
64 anode
65 presser roller
66 electrode roller
66a rotation shaft
67 plating bath
68 first presser roller 69 first electrode roller
69a rotation shaft
70 first anode
71 first feeding roller
72 second feeding roller
73 second anode
74 second presser roller
75 second electrode roller
75a rotation shaft
T tangent direction

The invention claimed is:

1. A method for producing a metal porous body, comprising the steps of:
    performing electrical conduction treatment on a surface of a skeleton of a sheet resin porous body having the skeleton with a three-dimensional network structure, to obtain a conductive resin porous body having a conductive layer;
    performing electroplating treatment on a surface of a skeleton of the conductive resin porous body to obtain a plated resin porous body having a metal plating layer; and
    performing treatment of removing at least the sheet resin porous body from the plated resin porous body to obtain a metal porous body, wherein
    in the electroplating treatment, the conductive resin porous body is supplied with power by a rotating electrode roller,
    the rotating electrode roller is supplied with power by bringing a power supply brush containing iron as a main component into sliding contact with a part of a rotation shaft of the rotating electrode roller, and
    at least a surface of at least the part of the rotation shaft with which the power supply brush is brought into contact contains iron or nickel as a main component.

2. The method for producing a metal porous body according to claim 1, wherein the rotation shaft of the rotating electrode roller contains iron as a main component and a periphery of the rotation shaft is coated with a material containing nickel as a main component.

3. The method for producing a metal porous body according to claim 1, wherein the rotation shaft has a core portion that is a material containing copper as a main component, a periphery of the copper is coated with a material containing iron as a main component, and further, a periphery of the material containing iron as a main component is coated with a material containing nickel as a main component.

4. The method for producing a metal porous body according to claim 1, wherein the power supply brush is in sliding contact with the rotation shaft with a lubricant, not containing conductive metal powder, interposed therebetween.

5. The method for producing a metal porous body according to claim 1, wherein, when the rotating electrode roller is rotated, the rotation shaft is immersed into a lubricant stored within a container that is disposed below the rotation shaft.

6. The method for producing a metal porous body according to claim 1, wherein heat generated in the power supply brush is dissipated to the outside by a heat dissipation member connected to the power supply brush.

7. The method for producing a metal porous body according to claim 1, wherein abrasion powder generated by abrasion of the power supply brush is guided and discharged to the outside by a groove formed on a contact surface of the power supply brush that is in contact with the rotation shaft.

8. The method for producing a metal porous body according to claim 7, wherein the groove is formed so as to extend in a direction crossing a tangent direction tangent to the rotation shaft.

9. The method for producing a metal porous body according to claim 1, wherein the power supply brush is biased and pressed against the rotation shaft by a biasing member.

* * * * *